(12) United States Patent
Dekker et al.

(10) Patent No.: US 8,930,383 B2
(45) Date of Patent: Jan. 6, 2015

(54) SYSTEM AND METHOD FOR AGGREGATION AND ASSOCIATION OF PROFESSIONAL AFFILIATION DATA WITH COMMERCIAL DATA CONTENT

(75) Inventors: Bethany Dekker, Sparta, NJ (US); John Nicodemo, Bethlehem, PA (US); Kimberly Rounds, Allentown, PA (US); Anthony J. Scriffignano, West Caldwell, NJ (US); Karma Hara, New York, NY (US); Michael Klein, Chatham, NJ (US); David Hanuschak, Orefield, PA (US)

(73) Assignee: The Dun & Bradstreet Corporation, Short Hills, NJ (US)

( * ) Notice: Subject to any disclaimer, the term of this patent is extended or adjusted under 35 U.S.C. 154(b) by 0 days.

(21) Appl. No.: 13/016,934

(22) Filed: Jan. 28, 2011

(65) Prior Publication Data

US 2011/0219034 A1    Sep. 8, 2011

Related U.S. Application Data

(60) Provisional application No. 61/299,802, filed on Jan. 29, 2010.

(51) Int. Cl.
*G06F 17/30* (2006.01)
*G06F 12/00* (2006.01)
*G06Q 10/10* (2012.01)

(52) U.S. Cl.
CPC .............. *G06Q 10/10* (2013.01); *G06Q 10/105* (2013.01); *Y10S 707/927* (2013.01)
USPC ............................ 707/758; 707/780; 707/927

(58) Field of Classification Search
CPC .................... G06F 17/30595; G06F 17/30604; G06F 17/30014; G06F 17/30672; G06F 7/00; G06F 17/27; G06F 12/00; G06F 2221/0744; G06Q 10/105; G06Q 10/10
See application file for complete search history.

(56) References Cited

U.S. PATENT DOCUMENTS 2,003,135 A     5/1935  Bowman
5,446,885 A  *  8/1995  Moore et al. .......................... 1/1
(Continued)

FOREIGN PATENT DOCUMENTS

EP    1026603 A2    8/2000
JP    2005011049    1/2005
JP    2005539283    12/2005

OTHER PUBLICATIONS

International Search Report and Written Opinion dated Apr. 7, 2011 based on corresponding PCT Application No. PCT/US11/23069.

(Continued)

*Primary Examiner* — Daniel Kuddus
(74) *Attorney, Agent, or Firm* — Ohlandt, Greeley, Ruggiero & Perle, L.L.P.

(57) ABSTRACT

There is provided a method that includes (i) receiving a first record that contains an identity of an individual, a name of a business, and a role of the individual in the business, (ii) matching the first record to data that provides a unique business identifier for the business, (iii) matching the first record to data that provides a unique individual identifier for the individual, (iii) appending to the first record (a) the unique business identifier, (b) the unique individual identifier, and (c) a unique role identifier for the role of the individual in the business, (iv) matching the first record to a second record based on the unique business identifier, the unique individual identifier, and the unique role identifier, and (v) consolidating the first and second records into a resultant record.

9 Claims, 4 Drawing Sheets

(56) References Cited

U.S. PATENT DOCUMENTS

| | | | |
|---|---|---|---|
| 5,557,087 A * | 9/1996 | Duyck | 235/380 |
| 5,664,109 A * | 9/1997 | Johnson et al. | 705/2 |
| 5,970,497 A * | 10/1999 | Burrows | 1/1 |
| 6,105,100 A * | 8/2000 | Dean et al. | 710/220 |
| 6,108,611 A * | 8/2000 | McEwen | 702/90 |
| 6,473,741 B1 * | 10/2002 | Baker | 705/31 |
| 6,539,396 B1 * | 3/2003 | Bowman-Amuah | 707/769 |
| 6,601,057 B1 * | 7/2003 | Underwood et al. | 715/207 |
| 6,625,657 B1 * | 9/2003 | Bullard | 709/237 |
| 6,751,663 B1 * | 6/2004 | Farrell et al. | 709/224 |
| 6,785,370 B2 * | 8/2004 | Glowny et al. | 379/88.22 |
| 7,171,400 B2 * | 1/2007 | Koubenski et al. | 1/1 |
| 7,333,966 B2 * | 2/2008 | Dozier | 706/21 |
| 7,392,240 B2 | 6/2008 | Scriffignano et al. | |
| 7,725,331 B2 * | 5/2010 | Schurenberg et al. | 705/3 |
| 7,801,808 B1 * | 9/2010 | Mattison et al. | 705/38 |
| 7,904,799 B1 * | 3/2011 | Underwood et al. | 715/208 |
| 2002/0035593 A1 * | 3/2002 | Salim et al. | 709/202 |
| 2003/0135826 A1 | 7/2003 | Dozier | |
| 2004/0078316 A1 * | 4/2004 | Clark et al. | 705/37 |
| 2004/0220918 A1 * | 11/2004 | Scriffignano et al. | 707/3 |
| 2006/0020611 A1 | 1/2006 | Gilbert et al. | |
| 2006/0129452 A1 * | 6/2006 | Nordberg et al. | 705/14 |
| 2007/0005892 A1 | 1/2007 | Mullender et al. | |

OTHER PUBLICATIONS

International Preliminary Report on Patentability dated Feb. 16, 2012 corresponding to International Patent Application No. PCT/US11/23069.

Russian Office Action (with English Translation) dated Dec. 30, 2013, based on corresponding Russian Application No. 2012136829, 10 pages.

Australian Office Action (with English Translation) dated Nov. 18, 2013 for Australian Patent Application No. 2011210597.

European Office Action dated Oct. 21, 2013 for European Patent Application No. 11737798.6.

Mexican Office Action (with English Translation) dated Apr. 11, 2014, based on corresponding Mexican Application No. MX/a/2012/008714, 5 pages.

Japanese Office Action (with English Translation) dated Jun. 24, 2014, based on corresponding Japanese Application No. OG1210P-JP, 3 pages.

Mexican Office Action (with English Translation) dated Aug. 22, 2014, based on corresponding Mexican Application No. MX/a/2012/008714, 6 pages.

"Agreement for the Adoption and Use by the Federal Public Administration in the Key only from Population Register" (with English Translation), Oct. 23, 1996, 6 pages.

* cited by examiner

SYSTEM AND METHOD FOR AGGREGATION AND ASSOCIATION OF PROFESSIONAL AFFILIATION DATA WITH COMMERCIAL DATA CONTENT

CROSS-REFERENCE TO RELATED APPLICATIONS

The present application is claiming priority of U.S. Provisional Patent Application Ser. No. 61/299,802, filed on Jan. 29, 2010, the content of which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present disclosure pertains to a system that performs a process of aggregating, pre-qualifying and consolidating one or more sources of information regarding individuals and business entities to which the individuals are or have been affiliated, thus yielding a professional profile, and storing and maintaining the professional profile in a managed data repository that can be accessed by other systems.

2. Description of the Related Art

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

For purposes of the present document, the term "professional" is defined as, of, or pertaining to a business entity, or pertaining to any role or title listed by the US Department of Labor, the Bureau of Labor Statistics or any other recognized agency.

There are professional profile products available in the current market. However, these products generally focus more on data regarding an individual than on the nature of a relationship the individual has with a business entity, or on business entities with which the individual has professional relationships. These professional profile products rely on a number of sources, including information directly provided by individuals. However, these professional profile products do not uniquely identify an individual or a business entity by employing a robust matching process for identification of the individual, the business entity, or the relationships between the individual and a business or multiple businesses.

These professional profile products access various sources to build professional profiles, but do not include processes to qualify the data from these sources in order to derive the best quality information from each of the various sources. In some cases they employ technology that does not allow for premium data elements related to the individual, such as email addresses and direct-dial telephone numbers, for example, to be appropriately validated and aggregated into professional profiles.

A technical deficiency with current professional profile products is that although they may be able to merge data about an individual in a business context, or associated with a business, from a plurality of sources, and store the merged data into a database, they may inadvertently produce more than one record for an individual person. The present invention overcomes this deficiency by a process that includes matching data from the plurality of sources to data in repository databases that provide unique identifiers for each individual and associated business, and then utilizing the unique identifiers to direct data about the individual to a single record.

SUMMARY OF THE INVENTION

There is provided a method that includes (i) receiving a first record that contains an identity of an individual, a name of a business, and a role of the individual in the business, (ii) matching the first record to data that provides a unique business identifier for the business, (iii) matching the first record to data that provides a unique individual identifier for the individual, (iii) appending to the first record (a) the unique business identifier, (b) the unique individual identifier, and (c) a unique role identifier for the role of the individual in the business, (iv) matching the first record to a second record based on the unique business identifier, the unique individual identifier, and the unique role identifier, and (v) consolidating the first and second records into a resultant record.

The present invention seeks to overcome the various disadvantages of current professional profile products. That is, the present invention seeks to generate professional profiles by associating multiple current and past roles a professional has, or has had, with one or more business entities, into one unified profile of an individual professional. It also seeks to improve the professional contact data processing through the use of regularly executed automated processes that assure data completeness, accuracy and timeliness. Furthermore, the present invention seeks to remove any limitations on number and type of contact records that can be processed. In addition, the present invention seeks to associate data to an individual, such as professional email addresses and direct phone numbers, with the unified profile created for that individual.

An advantage the present invention has over existing technology is the use of high-quality matching services against reference databases of data concerning individuals and businesses to build professional profiles with a high confidence of the accuracy for that data.

The present invention includes activities to identify, qualify, and aggregate multiple sources of current and former professional affiliation and contact information. The present invention includes processes to validate source data related to both individuals and business entities, and to associate the individual and related identity and contact data to the business entity, including the role that individual has with the business entity, with resulting information being published or stored in a data repository for later use by individuals or businesses that have been provided access to the data repository.

The process includes matching processes that are used to compare the multi-sourced information against established data repositories bearing information regarding individuals and business entities.

The present invention takes previously validated business entity information that includes a unique identifier for each business entity and each individual, and complies that information with previously validated individual information that includes a unique identifier for each individual, as well as unique identifier for each role an individual has held within a given associated business entity. The process thus yields a professional profile with unique identifiers applied to each unique value of business entity, individual identifier, and role.

The professional profile is placed in a comprehensive data repository that can be accessed by other systems and products. The comprehensive data repository thus contains data concerning both current and former professional affiliations and relationships between individuals and business entities, as well as the specific roles and titles relative to those relationships. In addition, the comprehensive data repository contains identification, contact, and other similar data for individuals and business entities, as well as unique identifiers of each individual, business entity, and the relationships there between. The invention includes processes to assess the comprehensive data repository against multiple data sources and other data repositories to assure the data is complete, accurate, and current.

The system and method of the present disclosure includes:
(a) assembling a plurality of data regarding individuals and business entities from at least one data source and providing such assembled data to a repository;
(b) cleansing, parsing and standardizing data; as well as conducting data validation for information regarding individuals and business entities within the assembled data;
(c) retrieving, evaluating, and selecting a candidate business entity that is most similar to the business entity data on the source record, thus yielding a business entity match, from a previously developed data repository that maintains data regarding business entities, and maintaining information about the quality of the business entity match;
(d) retrieving, evaluating, and selecting a candidate individual that is most similar to the individual on the source record, thus yielding an individual match, from a previously developed data repository that maintains data regarding individuals and maintaining information about the quality of the individual match;
(e) grouping source data records into professional profiles where one individual is associated to a business entity;
(f) further grouping the source data records into employment roles held at the business entities for each individual;
(g) prioritizing and aggregating source data from one or more source records into each profile and its associated role records; and
(h) publishing or storing data regarding the individuals, business entities, relationships between individuals and business entities, associated source identifiers, and processing dates into a data repository.

BRIEF DESCRIPTION OF THE DRAWINGS

A component or a feature that is common to more than one drawing is indicated with the same reference number in each of the drawings.

DESCRIPTION OF THE INVENTION

Figure 1:
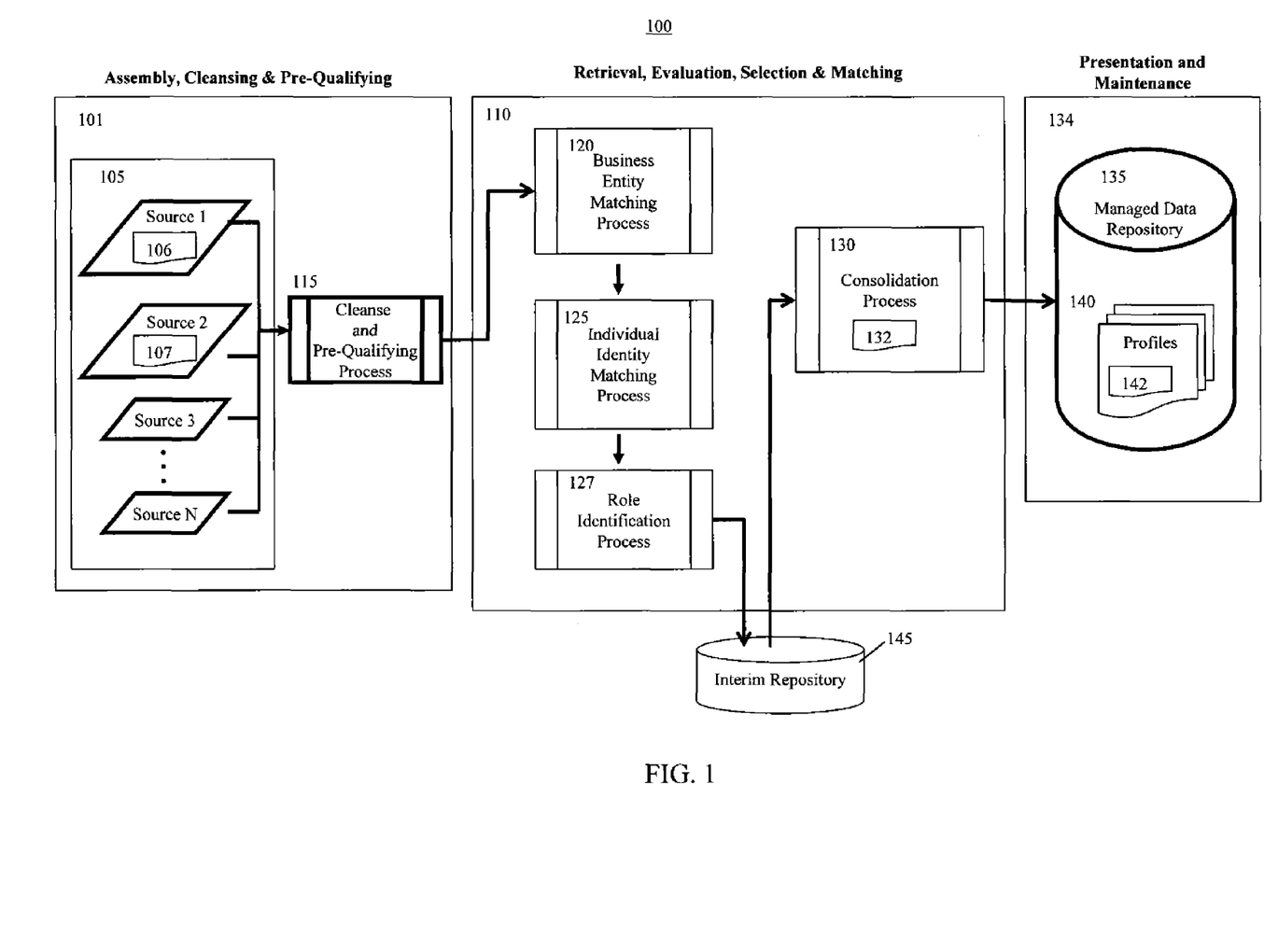
FIG. 1 is a functional block diagram of a method that transforms data from one or more sources into consolidated information that identifies individuals and their associated business entities and business relationships.

FIG. 1 is a functional block diagram of a method 100 that transforms data from one or more sources into consolidated information that identifies individuals and their associated business entities and business relationships. Method 100 includes three general operating phases, namely (1) assembly, cleaning and pre-qualifying phase 101, (2) retrieval, evaluation, selection and matching phase 110, and (3) presentation and maintenance phase 134.

Assembly, cleaning and pre-qualifying phase 101 involves collecting data from sources 105, and performing a cleanse and pre-qualifying process 115. Retrieval, evaluation, selection and matching phase 110 includes a business entity matching process 120, an individual identity matching process 125, a role identification process 127, and a consolidation process 130. Presentation and maintenance phase 134 includes operations involving a managed data repository 135.

Sources 105 are sources of data about an individual, i.e., a person, and a business with which the individual is affiliated. That is, sources 105 contain information such as individual identity data, business entity data, or a combination thereof. The data may include information such an individual's name, a business name, a business address, a job title, and a telephone number. The data may be obtained through exogenous activities, such as by purchasing the data, or through endogenous activities, such as by accessing internal files. Sources 105 include a plurality of sources, e.g., source 1 through source N. Source 1 includes a record 106, and source 2 includes a record 107. Although in FIG. 1, sources 105 includes a plurality of sources, method 100 is contemplated as being able to operate on data from a single source containing a single data structure, e.g., a single record.

In brief, method 100 assembles a plurality of data associated with individuals and business entities from sources 105, and produces profiles that uniquely identify associated individuals in the context of business entities and business relationships. The profiles are stored as profiles 140 in managed data repository 135.

Figure 2:
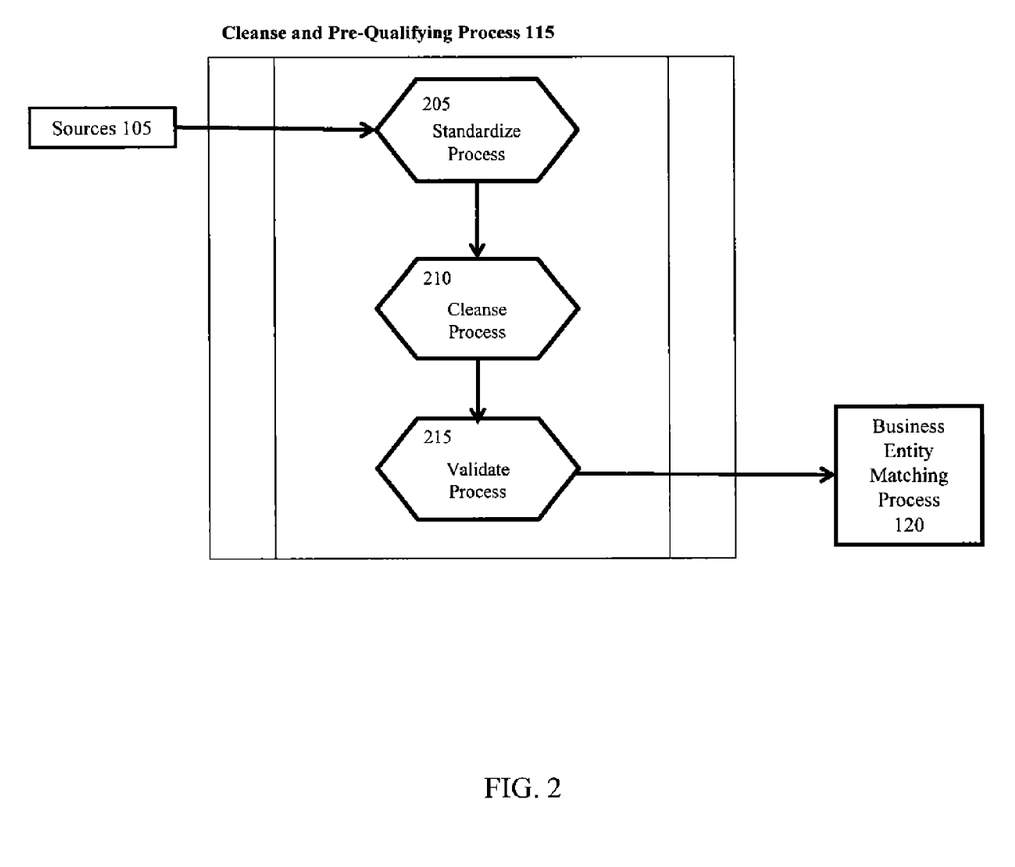
FIG. 2 is a functional block diagram of a cleanse and pre-qualifying process that is shown in FIG. 1.

FIG. 2 is a functional block diagram of cleanse and pre-qualifying process 115. Cleanse and pre-qualifying process 115 obtains data from sources 105 in a form of one or more data elements or records, and performs a standardize process 205, a cleanse process 210 and a validate process 215. Standardize process 205 and cleanse process 210 are used to standardize and cleanse, respectively, data elements in each incoming source record, including but not limited to business name, address, and business phone number. In executing standardize process 205 and cleanse process 210, only records that meet pre-defined acceptance criteria are accepted for further processing. The pre-defined acceptance criteria can be any desired criteria for determining whether data is suitable for further processing, e.g., a U.S. telephone number must have 10 digits.

Standardize process 205 standardizes data elements contained in a record. For example, standardize process 205 may do one or more of (a) establish a physical address for a mailing address in cases where a physical address data element is not available, (b) identify and assign appropriate country codes to data from sources 105, or (c) generate and assign a standardized numeric code that identifies the business role held by a given individual that is represented in data from sources 105.

Cleanse process 210 removes unwanted, superfluous or irrelevant data. For example, cleanse process 210 may do one or more of (a) search for, and remove, cell phone numbers and fax numbers, (b) identify and remove non-standard last name suffixes, or (c) identify and remove e-mail addresses with unusable domains.

Validate process 215 validates various data elements in a record. For example validate process 215 may do one or more of (a) confirm a current role and phone number of a given individual within a given business entity pulled from sources 105, or (b) conduct a server to server email address verification for email addresses in data from sources 105.

Thus, cleanse process 210 and validate process 215 identify data and records from sources 105 that are invalid and remove the invalid data and records so that it is not further processed.

Figure 3:
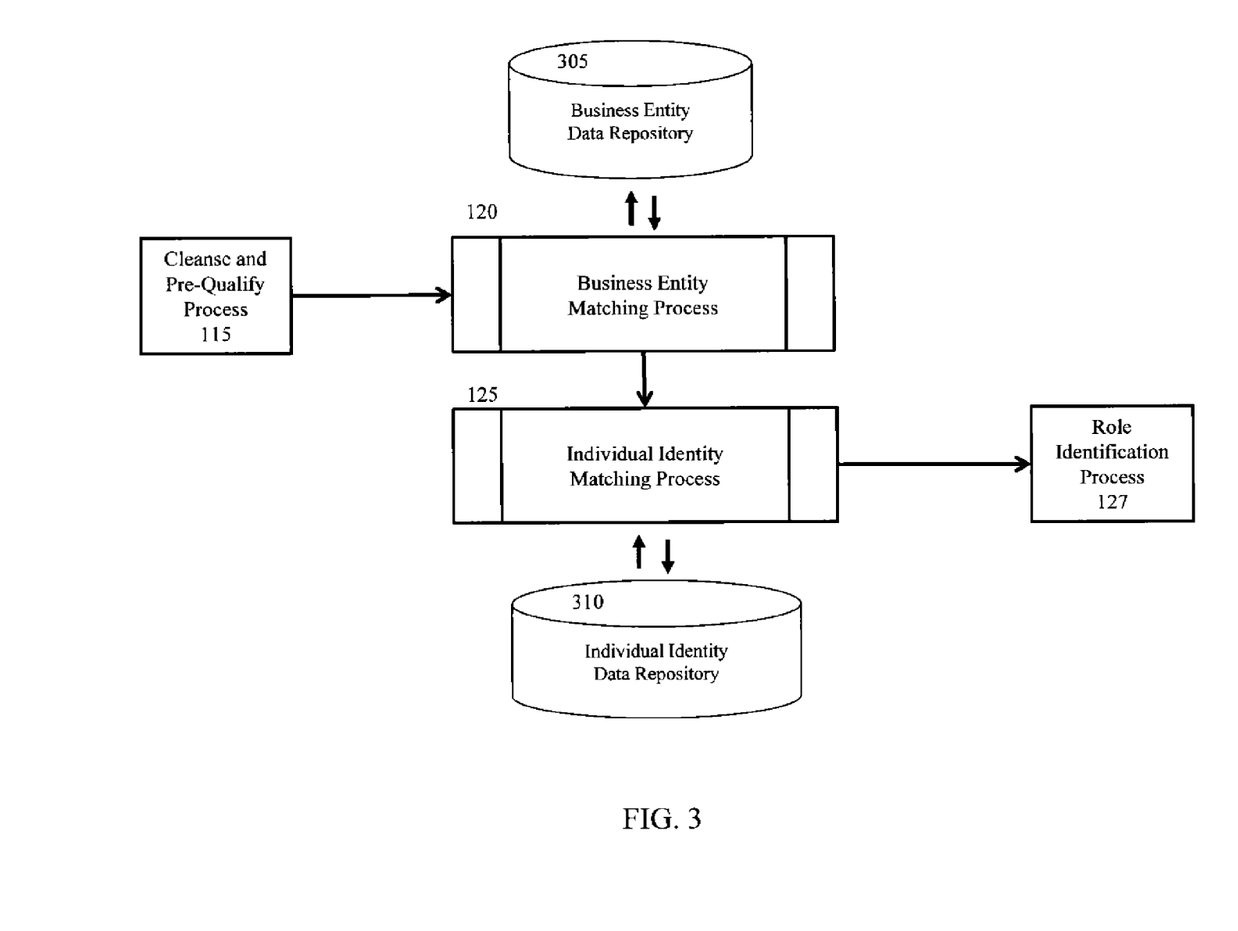
FIG. 3 is a functional block diagram of operations performed by a business entity matching process and an individual identity matching process that are shown in FIG. 1.

FIG. 3 is a functional block diagram of operations performed by business entity matching process 120 and individual identity matching process 125. For purposes of example, assume that record 106 is being processed.

Business entity matching process 120 and individual identity matching process 125 retrieve, evaluate and select business entity and individual identity information from previously developed data repositories that is most similar to data in source record 106.

Business entity matching process 120 receives record 106 from those promoted by cleanse and pre-qualifying process 115, identifies data within record 106 that are associated with a specific business entity, and queries business entity data repository 305 for additional information about that specific business entity. Business entity matching process 120 identifies the likely business associated with source record 106 and applies a unique identifier, a match grade string, a match data profile, and a confidence code when a match is identified (see U.S. Pat. No. 7,392,240 (Scriffignano et al.), which is incorporated herein by reference in its entirety).

A unique identifier is a multi-character code that identifies a subject so that the subject can be distinguished from all other subjects. A given unique identifier may be used only once. Preferably, the unique identifier is persistent, that is, it is assigned only once and is never recycled. As such, once a unique identifier is assigned to a subject, that unique identifier will only indentify that particular subject. A data universal numbering system (DUNS) number can serve as such a unique identifier.

A match grade string is string of grades that indicates the quality of matches for fields of data in a record. For example, assume that record 106 contains two fields, and that business entity matching process 120 attempts to match the two fields to a record in business entity data repository 305. Assume also that data in the first field is an exact match, and that data in the second field is only a partial match. As such, the match of the first field deserves a better match grade than does the match of the second field.

A match data profile is a code that indicates what particular elements of two records were used in a determination of a match of the two records. For example, assume that we have a first record concerning ABC Co. that is matched to a second record for ABC Co. by recognizing that each of the two records indicates the same company president, or same trade name, or same former business name. Accordingly, the match data profile would indicate that the match was made based on the match of the president, or trade name, or former business name.

A confidence code indicates a degree of certainty of a match being correct.

Business entity data repository 305 is a database of information about businesses, which has been previously developed and verified for accuracy. Examples of business information contained within business entity data repository 305 may include legal name of business, trade names, mailing address, physical address, and main phone number. Business entity data repository 305, in response to the query from business entity matching process 120, returns business data that business entity matching process 120 deems as being a match to the business that is identified in record 106. The business data from business entity data repository 305 also includes a unique identifier, e.g., a DUNS number, for the business.

Thus, business entity matching process 120 selects the set of data that is the closest match to corresponding data in record 106. For example, business entity matching process 120 finds a best match between business data record 106, and data in business entity data repository 305. Business entity matching process 120 then appends to record 106, the unique business identifier, and other information (similar to a match grade string, a match data profile, and a confidence code), which are thereafter used in consolidation process 130. Business entity matching process 120 then forwards record 106 to individual identity matching process 125.

Individual identity matching process 125 receives record 106 and identifies data within record 106 that are attributes associated with a specific individual identity, i.e. a specific person, and queries an individual identity data repository 310 for more information about that specific person. Individual identity matching process 125 utilizes a matching process similar to that utilized by business entity matching process 120, to identify the individual that is most likely associated with record 106.

Individual identity data repository 310 is a database of information about individuals, which has been previously developed and verified for accuracy. Examples of individual identity information contained within individual identity data repository 310 include first name, secondary name, surname, birth month, birth day, birth year, city of residence, and state of residence. Individual identity data repository 310, in response to the query from individual identity matching process 125, returns individual identity data that individual identity matching process 125 deems as being a match to the individual that is identified in record 106. The individual identity data from individual identity data repository 310 also includes a unique identifier for the individual, i.e., a unique individual identifier.

Thus, individual identity matching process 125 selects the data that are the closest match to corresponding data in record 106. For example, individual identity matching process 125 finds a best match between data about the individual in record 106, and data in individual identity data repository 310. Individual identity matching process 125 then appends to record 106, the unique individual identifier, a match grade string, a match data profile, and a confidence code, which are thereafter used in consolidation process 130. Individual identity matching process 125 then forwards record 106 to role identification process 127.

Refer again to FIG. 1.

Role identification process 127 assigns, to record 106, a unique role identifier. The unique role identifier is a unique identifier that identifies a particular role of a particular person at a particular business. The unique role identifier is based on the role code that was assigned in standardize process 205, the unique business identifier that was assigned in business entity matching process 120, and the unique individual identifier that was assigned in individual identity matching process 125. Method 100 then stores record 106 into an interim storage, i.e., interim repository 145.

Assume that record 107 includes data concerning the same individual as record 106, but the data in record 107 is not identical to the data that was in record 106. Record 107 may or may not contain the same business data as in record 106. Method 100 processes record 107 in a manner similar to that of record 106, and as such, appends to record 107 the same individual identity information and unique identifier for the individual, and also appends business information, a unique business identifier, and a unique role identifier appropriate to the business information in record 107, which may or may not be the same as the business information and unique business identifier for the business in record 106. Method 100 then stores record 107 into interim repository 145.

Consolidation process 130 groups, prioritizes and aggregates records that have been processed by business entity matching process 120, individual identity matching process 125, and role identification process 127, and builds a composite record that provides a composite view of a given individual's business roles, relationships and associations with one or more business entities. Consolidation process 130 obtains records 106 and 107 from interim repository 145, and compiles and ranks records 106 and 107 in association with other records that have been processed by business entity matching process 120, individual identity matching process 125, and role identification process 127. However, for the present discussion, we will limit our discussion to a consideration of records 106 and 107.

Consolidation process 130 identifies records 106 and 107 as belonging to the same unique individual based on the unique business identifier assigned by business entity matching process 120, the unique individual identifier assigned by individual identity matching process 125, and the unique role identifier assigned by role identification process 127, thus yielding a profile 132.

Consolidation process 130 groups professional attributes such as role, title, and locations of business associated with profile 132, and ranks and organizes the attributes in profile 132 based on data characteristics such as source of data (e.g., source 1 versus source 2), age of data, or quality of match, e.g., match grade string, as identified during business entity matching process 120 and individual identity matching process 125. Profile 132 is thus a compiled record for a given unique individual that provides a composite view of that individual and the role or roles that individual has held within one or more business entities.

Managed data repository 135 receives profile 132 from consolidation process 130, and stores it as a profile 142. Managed data repository 135 holds a plurality of profiles 140. Profile 142 is one of the plurality of profiles 140.

In review, method 100 (i) receives a record 106, which contains an identity of an individual, a name of a business, and a role of the individual in the business, (ii) matches record 106 to data in business entity data repository 305 that provides a unique business identifier for the business, (iii) matches record 106 to data in individual identity data repository 310 that provides a unique individual identifier for the individual, (iii) appends to record 106 (a) the unique business identifier, (b) the unique individual identifier, and (c) a unique role identifier for the role of the individual in the business, (iv) matches record 106 to record 107 based on the unique business identifier, the unique individual identifier, and the unique role identifier, and (v) consolidates records 106 and 107 into a resultant record, i.e., profile 132.

In method 100, business entity matching process 120 and individual identity matching process 125 are executed in a sequence of business entity matching process 120 followed by individual identity matching process 125. However, these two processed can be executed in a sequence of individual identity matching process 125 followed by business entity matching process 120, or executed concurrently with one another. Also, method 100 does not necessarily need to complete processing of a first record before processing a second record, but instead, may concurrently process a plurality of records.

Figure 4:
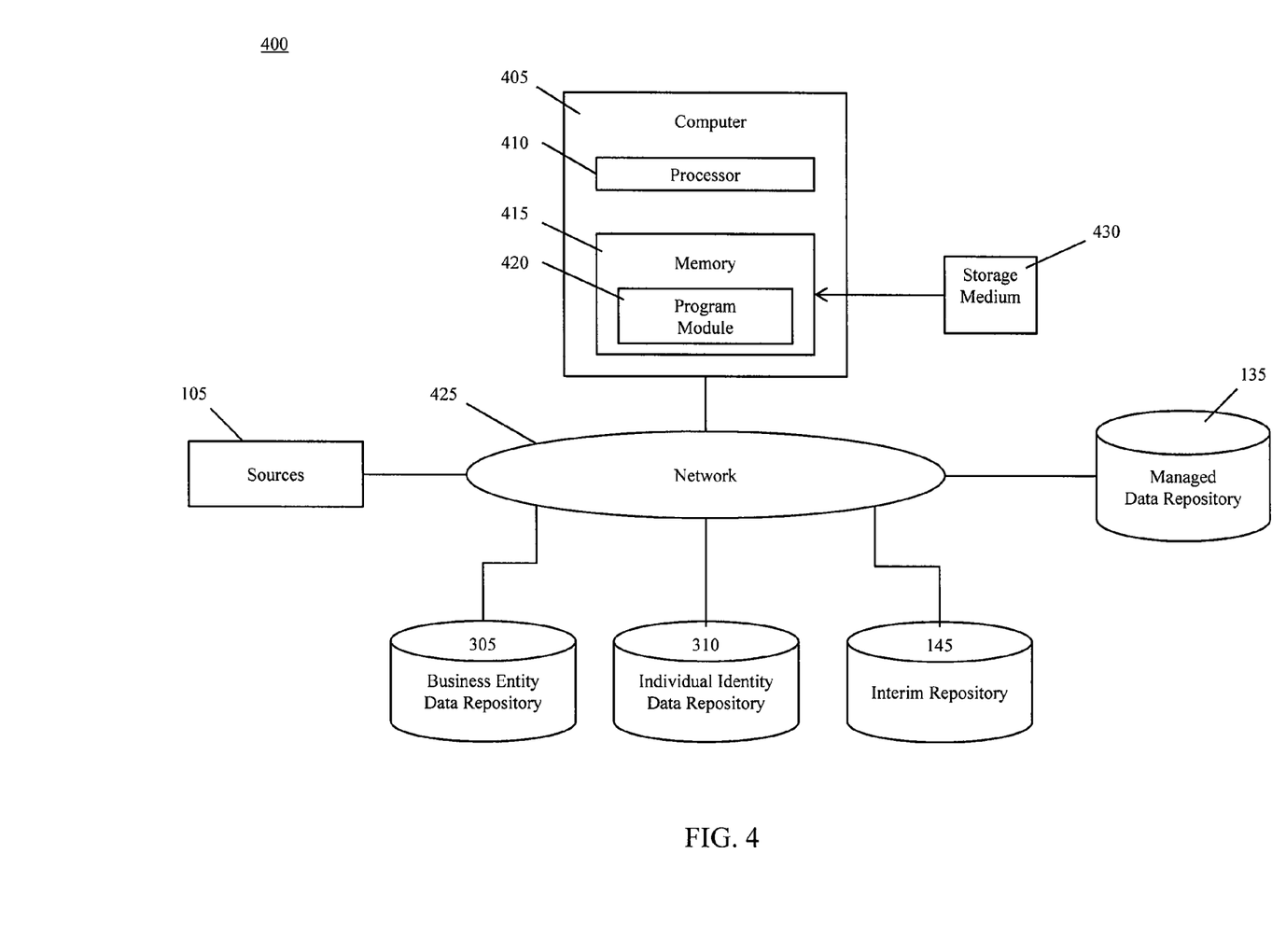
FIG. 4 is a block diagram of a system for performing the method of FIG. 1.

FIG. 4 is a block diagram of a system 400, for performing method 100. System 400 includes a computer 405, e.g., a server, coupled to a network 425, e.g., the Internet.

Computer 405 includes a processor 410, and a memory 415. Although computer 405 is represented herein as a standalone device, it is not limited to such, but instead can be coupled to other devices (not shown) in a distributed processing system.

Processor 410 is an electronic device configured of logic circuitry that responds to and executes instructions.

Memory 415 is a device that contains data and instructions that are readable and executable by, and thus control operations of, processor 410. Memory 415 may be implemented in a random access memory (RAM), a hard drive, a read only memory (ROM), or a combination thereof. One of the components of memory 415 is a program module 420.

Program module 420 contains instructions that cause processor 410 to execute the methods described herein. For example, under control of program module 420, processor 410 performs the operations of cleanse and pre-qualifying process 115, business entity matching process 120, individual identity matching process 125, role identification process 127, and consolidation process 130.

The term "module" is used herein to denote a functional operation that may be embodied either as a stand-alone component or as an integrated configuration of a plurality of sub-ordinate components. Thus, program module 420 may be implemented as a single module or as a plurality of modules that operate in cooperation with one another. Accordingly, each of cleanse and pre-qualifying process 115, business entity matching process 120, individual identity matching process 125, role identification process 127, and consolidation process 130 may be configured as a stand-alone process or as a hierarchy of subordinate processes.

Moreover, although program module 420 is described herein as being installed in memory 415, and therefore being implemented in software, it could be implemented in any of hardware (e.g., electronic circuitry), firmware, software, or a combination thereof.

Via network 425, processor 410 communicates with each of sources 105, business entity data repository 305, individual identity data repository 310, interim repository 145, and managed data repository 135. For example, processor 410 reads data from sources 105, queries and receives data from business entity data repository 305 and individual identity data repository 310, and outputs profile 132 to managed data repository 135. Although business entity data repository 305, individual identity data repository 310, interim repository 145, and managed data repository 135 are represented in FIG. 4 as being discrete databases, they could be embodied in a single database system or distributed over a plurality of database systems.

While program module 420 is indicated as already loaded into memory 415, it may be configured on a storage medium 430 for subsequent loading into memory 415. Storage medium 430 is also a computer-readable medium encoded with a computer program, and can be any conventional storage medium that stores program module 420 thereon in tangible form. Examples of storage medium 430 include a floppy disk, a compact disk, a magnetic tape, a read only memory, an optical storage media, universal serial bus (USB) flash drive, a digital versatile disc, or a zip drive. Alternatively, storage medium 430 can be a random access memory, or other type of electronic storage, located on a remote storage system and coupled to computer 405 via network 425.

Table 1, below, provides an example of method 100 processing records 106 and 107. For this example, assume that method 100 processes records 106 and 107 concurrently. Revisions of data in records 106 and 107 are shown with bold font. Although Table 1 indicates that cleanse and pre-qualifying process 115, business entity matching process 120, individual identity matching process 125, role identification process 127, and consolidation process 130 are performing certain operations, in practice, the operations are performed by processor 410.

TABLE 1

Exemplary Processing of Records

| | Step in Process | Activity | State of Record/Profile |
|---|---|---|---|
| 1 | Record 106 is in Sources 105 | Waiting to enter Cleanse & Pre-Qualify Process 115 | (Record 106)<br>John Smith<br>President<br>ABC Inc<br>350 Fifth Ave Suite7712<br>New York, NY 10118<br>(917) 555-5555<br>jsmith@abcinc.com<br>Birth Mon 01<br>Birth Day 27<br>Birth Yr 1975<br>Last 4 SSN: |
| 2 | Record 107 is in Sources 105 | Waiting to enter Cleanse & Pre-Qualify Process 115 | (Record 107)<br>Jonathan R. Smith II<br>Product Director<br>DEF Inc<br>160 Columbus Avenue<br>New York, NY 10023<br>(212) 555-1100<br>jsmith@defllc.com<br>Birth Mon 01<br>Birth Day 27<br>Birth Yr 1975<br>Last 4 SSN: |
| 3 | Cleanse & Pre-Qualify Process 115 | Cleanse and Pre-Qualify Process 115 identifies and removes cell phone number from Record 106. Address is standardized. Email is validated. A role code, based on the tile of "President" is appended. Record 106 proceeds. | (Record 106)<br>John Smith<br>President<br>ABC Inc<br>350 5th Ave Ste7712<br>New York, NY 10018<br>jsmith@abcinc.com<br>Birth Mon 01<br>Birth Day 27<br>Birth Yr 1975<br>Last 4 SSN:<br>Role Code: 400 |
| 4 | Cleanse & Pre-Qualify Process 115 | Cleanse and Pre-Qualify Process 115 removes name suffix from Record 107. Address is standardized. Email is validated. A role code, based on the tile of "Product Director" is appended. Record 107 proceeds. | (Record 107)<br>Jonathan R. Smith<br>Product Director<br>DEF Inc<br>160 Columbus Av<br>New York, NY 10023<br>(212) 555-1100<br>jsmith@defllc.com<br>Birth Mon 01<br>Birth Day 27<br>Birth Yr 1975<br>Last 4 SSN:<br>Role Code: 300 |
| 5 | Business Entity Matching Process 120 | Business Entity Matching Process 120 queries Business Entity Data Repository 305 for data that most closely matches business data in Record 106. Business Entity Data Repository 305 returns a response. Business data in Record 106 is rewritten with valid data supplied by Business Entity Data Repository 305 and a unique business identifier (e.g. DUNS number) is assigned. | (Record 106)<br>John Smith<br>President<br>Avid Baseball Cards Inc<br>350 5th Ave Ste7700<br>New York, NY 10118<br>(212) 555-1010<br>jsmith@abcinc.com<br>Birth Mon 01<br>Birth Day 27<br>Birth Yr 1975<br>Last 4 SSN:<br>Role Code: 400<br>Unique Business Identifier: 123456789 |
| 6 | Business Entity Matching Process 120 | Business Entity Matching Process 120 queries Business Entity Data Repository 305 for data that most closely matches business data in Record 107. Business Entity Data | (Record 107)<br>Jonathan R. Smith<br>Product Director<br>Darn Exciting Football LLC<br>1600 Broadway<br>New York, NY 10023 |

TABLE 1-continued

Exemplary Processing of Records

| Step in Process | Activity | State of Record/Profile |
|---|---|---|
| | Repository 305 returns a response. Business data in Record 107 is rewritten with valid data supplied by Business Entity Data Repository 305 and a unique business identifier (e.g. DUNS number) is assigned. | (212) 555-1100<br>jsmith@defllc.com<br>Birth Mon 01<br>Birth Day 27<br>Birth Yr 1975<br>Last 4 SSN:<br>Role Code: 300<br>Unique Business Identifier: 234567890 |
| 7 Individual Identity Matching Process 125 | Individual Identity Matching Process 125 queries Individual Identity Data Repository 310 for data that most closely matches individual identity data in Record 106. Individual Identity Data Repository 310 returns a response. Individual identity data in Record 106 is rewritten with valid data supplied by Individual Identity Data Repository 310 and unique individual identifier is assigned. | (Record 106)<br>Jonathan R. Smith<br>President<br>Avid Baseball Cards Inc<br>350 5th Ave Ste7700<br>New York, NY 10118<br>(212) 555-1010<br>jsmith@abcinc.com<br>Birth Mon 01<br>Birth Day 27<br>Birth Yr 1975<br>Last 4 SSN: 0101<br>First 3 SSN: 057<br>Role Code: 400<br>Unique Business Identifier: 123456789<br>Unique Individual Identifier: 3456789012345 |
| 8 Individual Identity Matching Process 125 | Individual Identity Matching Process 125 queries Individual Identity Data Repository 310 for data that most closely matches individual identity data in Record 107. Individual Identity Data Repository 310 returns a response. Individual identity data in Record 107 is rewritten with valid data supplied by Individual Identity Data Repository 310 and unique individual identifier is assigned. | (Record 107)<br>Jonathan R. Smith<br>Product Director<br>Darn Exciting Football LLC<br>1600 Broadway<br>New York, NY 10023<br>(212) 555-1100<br>jsmith@defllc.com<br>Birth Mon 01<br>Birth Day 27<br>Birth Yr 1975<br>Last 4 SSN: 0101<br>First 3 SSN: 057<br>Role Code: 300<br>Unique Business Identifier: 234567890<br>Unique Individual Identifier: 3456789012345 |
| 9 Role Identification Process 127 | Role Identification Process 127 assigns, to Record 106, a unique role identifier that is based on the role code that was assigned in Standardize Process 205, the unique business identifier that was assigned in Business Entity Matching Process 120, and the unique individual identifier that was assigned in Individual Identity Matching Process 125. | (Record 106)<br>Jonathan R. Smith<br>President<br>Avid Baseball Cards Inc<br>350 5th Ave Ste7700<br>New York, NY 10118<br>(212) 555-1010<br>jsmith@abcinc.com<br>Birth Mon 01<br>Birth Day 27<br>Birth Yr 1975<br>Last 4 SSN: 0101<br>First 3 SSN: 057<br>Role Code: 400<br>Unique Business Identifier: 123456789<br>Unique Individual Identifier: 3456789012345<br>Unique Role Identifier: 4567890123456 |
| 10 Role Identification Process 127 | Role Identification Process 127 assigns, to Record 107, a unique role identifier that is based on the role code that was assigned in Standardize Process 205, the unique business identifier that was assigned in Business Entity Matching Process 120, and the unique individual identifier | (Record 107)<br>Jonathan R. Smith<br>Product Director<br>Darn Exciting Football LLC<br>1600 Broadway<br>New York, NY 10023<br>(212) 555-1100<br>jsmith@defllc.com<br>Birth Mon 01<br>Birth Day 27 |

TABLE 1-continued

Exemplary Processing of Records

| Step in Process | Activity | State of Record/Profile |
|---|---|---|
| | that was assigned in Individual Identity Matching Process 125. | Birth Yr 1975<br>Last 4 SSN: 0101<br>First 3 SSN: 057<br>Role Code: 300<br>Unique Business Identifier: 234567890<br>Unique Individual Identifier: 3456789012345<br>Unique Role Identifier: 5678901234567 |
| 11 Consolidation Process 130 | Consolidation Process 130 receives Records 106 and 107, and identifies Records 106 and 107 as likely to be same person in different business contexts. Consolidation Process 130 groups and ranks information in both records to create a compiled view that reflects the unique individual John Smith in multiples business contexts and presents Profile 132 to Managed Data Repository 135 | (Profile 132)<br>Jonathan R. Smith<br>President<br>Avid Baseball Cards Inc<br>350 5th Ave Ste7700<br>New York, NY 10118<br>(212) 555-1010<br>jsmith@abcinc.com<br>Birth Mon 01<br>Birth Day 27<br>Birth Yr 1975<br>Last 4 SSN: 0101<br>First 3 SSN: 057<br>Role Code: 400<br>Unique Business Identifier: 123456789<br>Unique Individual Identifier: 3456789012345<br>Unique Role Identifier: 4567890123456<br>Jonathan R. Smith<br>Product Director<br>Darn Exciting Football LLC<br>1600 Broadway<br>New York, NY 10023<br>(212) 555-1100<br>jsmith@defllc.com<br>Birth Mon 01<br>Birth Day 27<br>Birth Yr 1975<br>Last 4 SSN: 0101<br>First 3 SSN: 442<br>Role Code: 300<br>Unique Business Identifier: 234567890<br>Unique Individual Identifier: 3456789012345<br>Unique Role Identifier: 5678901234567 |
| 12 Managed Data Repository 135 | Managed Data Repository 135 receives Profile 132, and stores it as Profile 142. Managed Data Repository 135 maintains Profiles 140 for various methods of access and various business needs | (Profile XXX)<br>Jonathan R. Smith<br>Unique Individual Identifier: 3456789012345<br>President<br>Avid Baseball Cards Inc<br>350 5th Ave Ste7700<br>New York, NY 10118<br>(212) 555-1010<br>jsmith@abcinc.com<br>Role Code: 400<br>Unique Business Identifier: 123456789<br>Unique Role Identifier: 4567890123456<br>Product Director<br>Darn Exciting Football LLC<br>1600 Broadway<br>New York, NY 10023<br>(212) 555-1100<br>Role Code: 300<br>Unique Business Identifier: 234567890<br>Unique Role Identifier: 5678901234567 |

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

What is claimed is:

1. A computer-implemented method comprising a processor performing actions of:
   standardizing and cleansing data elements of a record;
   validating to determine when said record meets an acceptance criteria, which generates a first record;
   receiving said first record that contains an identity of an individual, a name of a business, and a role of said individual in said business;
   performing a first matching process that matches said first record to data in a first database that returns a unique business identifier that uniquely identifies said business, wherein performing said first matching process comprises finding a best match between business data in said first record and data in said first database;
   performing a second matching process that matches said first record to data in a second database that returns a unique individual identifier that uniquely identifies said individual;
   performing a role identification process that returns a unique role identifier that uniquely identifies said role of said individual in said business;
   appending to said first record (a) said unique business identifier, (b) said unique individual identifier, and (c) said unique role identifier;
   matching said first record to a second record having said unique individual identifier; and
   consolidating said first and second records into a resultant record having (a) said unique business identifier, (b) said unique individual identifier, and (c) said unique role identifier.

2. The computer-implemented method of claim 1, wherein performing said second matching process comprises finding a best match between data about said individual in said first record and data in said second database.

3. The computer-implemented method of claim 1, wherein said unique business identifier comprises a data universal numbering system (DUNS) number.

4. A computer-implemented system comprising:
   a processor; and
   a memory that contains instructions that are readable by said processor and that, when read by said processor, cause said processor to:
   perform a standardization and cleanse of data elements of a record;
   perform a validation to determine when said record meets an acceptance criteria, which generates a first record;
   receive said first record that contains an identity of an individual, a name of a business, and a role of said individual in said business;
   perform a first matching process that matches said first record to data in a first database that returns a unique business identifier that uniquely identifies said business, wherein said first matching process comprises finding a best match between business data in said first record and data in said first database;
   perform a second matching process that matches said first record to data in a second database that returns a unique individual identifier that uniquely identifies said individual;
   perform a role identification process that returns a unique role identifier that uniquely identifies said role of said individual in said business;
   append to said first record (a) said unique business identifier, (b) said unique individual identifier, and (c) said unique role identifier;
   match said first record to a second record having said unique individual identifier; and
   consolidate said first and second records into a resultant record having (a) said unique business identifier, (b) said unique individual identifier, and (c) said unique role identifier.

5. The computer-implemented system of claim 4, wherein said instructions to cause said processor to perform said second matching process comprise instructions that cause said processor to find a best match between data about said individual in said first record, and data in said second database.

6. The computer-implemented system of claim 4, wherein said unique business identifier comprises a data universal numbering system (DUNS) number.

7. A non-transitory computer-readable storage medium that contains instructions that are readable by said processor to cause said processor to:
   perform a standardization and cleanse of data elements of a record;
   perform a validation to determine when said record meets an acceptance criteria, which generates a first record;
   receive said first record that contains an identity of an individual, a name of a business, and a role of said individual in said business;
   perform a first matching process that matches said first record to data in a first database that returns a unique business identifier that uniquely identifies said business, wherein said first matching process comprises finding a best match between business data in said first record and data in said first database;
   perform a second matching process that matches said first record to data in a second database that returns a unique individual identifier that uniquely identifies said individual;
   perform a role identification process that returns a unique role identifier that uniquely identifies said role of said individual in said business;
   append to said first record, (a) said unique business identifier, (b) said unique individual identifier, and (c) said unique role identifier;
   match said first record to a second record having said unique individual identifier; and
   consolidate said first and second records into a resultant record having (a) said unique business identifier, (b) said unique individual identifier, and (c) said unique role identifier.

8. The non-transitory computer-readable storage medium of claim 7, wherein said instructions to cause said processor to perform said second matching process comprise instructions that cause said processor to find a best match between data about said individual in said first record and data in said second database.

9. The non-transitory computer-readable storage medium of claim 7, wherein said unique business identifier comprises a data universal numbering system (DUNS) number.

* * * * *